United States Patent Office 3,484,193
Patented Dec. 16, 1969

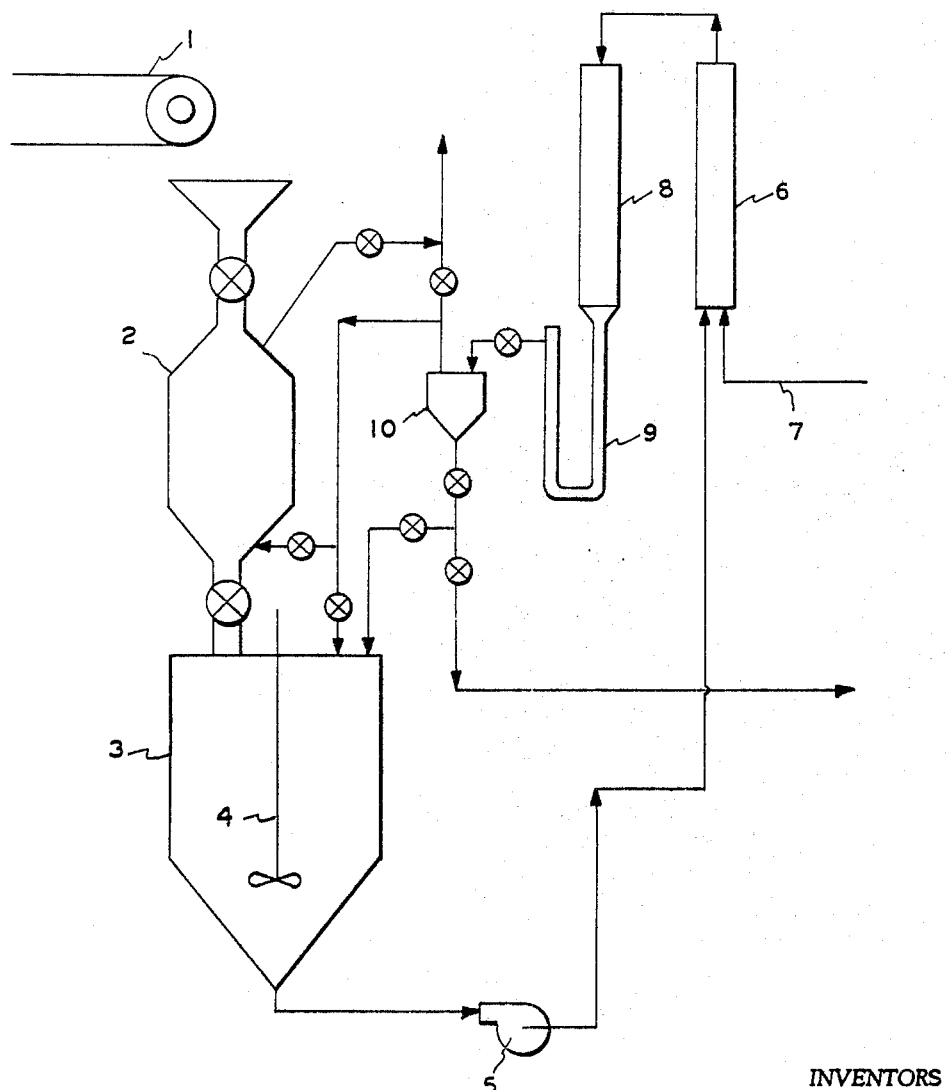

3,484,193
PROCESS FOR PRODUCING AMMONIUM SULFAMATE
Shinji Azakami, Toshio Kawakami, and Yoshiharu Takemoto, Sunagawa, Japan, assignors to Toyo Koatsu Industries, Incorporated, Tokyo, Japan, a corporation of Japan
Filed Apr. 9, 1965, Ser. No. 446,812
Claims priority, application Japan, Apr. 10, 1964,
39/20,044
Int. Cl. C01b *17/98;* C01c *1/24*
U.S. Cl. 23—114                                    7 Claims

ABSTRACT OF THE DISCLOSURE

A novel processs for continuously producing ammonium sulfamate comprises mixing ammonium imidosulfonate with molten ammonium sulfamate to form a slurry, heating the resulting slurry under an ammonia pressure to convert the ammonium imidosulfonate to ammonium sulfamate in the molten state and recycling a part of the ammonium sulfamate produced for use as said molten ammonium sulfamate mixed with imidosulfonate.

---

This invention relates to a process for producing ammonium sulfamate from ammonium imidosulfonate.

It is already known to produce ammonium sulfamate by heating ammonium imidosulfonate under an ammonia pressure. However, as ammonium imidosulfonate is a solid, it is necessary to feed it into a high pressure reactor in the form of a melt, solution or slurry. Since ammonium imidosulfonate melts above 280° C., it is mechanically and materially impossible to compress and introduce such high temperature melt into a high pressure reaction tube.

A process for producing ammonium sulfamate from ammonium imidosulfonate and aqueous ammonia solution is mentioned in German Patent 1,107,208. Therefore, it is expected that, if aqueous ammonia solution is used as a medium, ammonium imidosulfonate is continuously fed into a high pressure reactor. However, there are defects that the yield of ammonium sulfamate is rather low, that the amount of production of ammonium sulfate is large and further that concentration and separation of the reaction product is costly.

An object of present invention is to provide a process for continuously producing ammonium sulfamate at a high conversation ratio from ammonium imidosulfonate.

It has been found that ammonium sulfamate is continuously produced from ammonium imidosulfonate by a process comprising heating under an ammonia pressure ammonium imidosulfonate as suspended in molten ammonium sulfamate to convert ammonium imidosulfonate to ammonium sulfamate and circulating a part of ammonium sulfamate as a medium for suspending the raw material ammonium imidosulfonate.

Ammonium sulfamate obtained by heating ammonium imidosulfonate under an ammonia pressure can be kept in a molten state above 125° C., and, even if ammonium imidosulfonate is suspended in it, it does not solidify above 125° C. Below 150° C., ammonium sulfamate does not substantially thermodecompose even in air under the normal pressure. Further, a slurry prepared by suspending less than an equal amount by weight of ammonium imidosulfonate to ammonium sulfamate in a melt of the latter has such viscosity as allow it to be fed into a high pressure reactor with a pump at a temperature of about 125 to 150° C. Therefore, in the present invention, it is desirable that less than an equal amount by weight of ammonium imidosulfonate to ammonium sulfamate is suspended in a melt of ammonium sulfamate and that the temperature of the resulting slurry is lower than the thermodecomposing temperature (of about 150° C.) of ammonium sulfamate but is higher than the temperature of 125° C. at which the slurry does not solidify.

For the conditions of converting ammonium imidosulfonate to ammonium sulfamate under an ammonia pressure, it is desirable that the pressure is 10 to 50 kg./cm.² and the temperature is 170 to 280° C.

Among the kinds of ammonium imidosulfonate are diammonium imidosulfonate (($NH_4SO_3)_2NH$) and triammonium imidosulfonate (($NH_4SO_3)_2N \cdot NH_4$). Either of them can be used as a raw material in the present invention. However, for the following reason, it is preferable to use triammonium imidosulfonate as a raw material. That is to say, as a part of triammonium imidosulfonate can be converted to ammonium sulfamate at a comparatively low temperature in an ammonia atmosphere under the normal pressure, there is an advantage that the mixing ratio of the raw material triammonium imidosulfonate to ammonium sulfamate can be increased, if the step of suspending ammonium imidosulfonate in ammonium sulfamate is carried out in an ammonia atmosphere. Therefore, in the case of using diammonium imidosulfonate as a raw material, it is preferable to convert it to triammonium imidosulfonate in an ammonia atmosphere in advance. SUS 27 (austenitic chromium-nickel steel corresponding to AISI 304) and SUS 33 (austenitic chromium-nickel steel corresponding to AISI 316 L) have sufficient anticorrosiveness to the suspension of ammonium imidosulfonate in ammonium sulfamate at a temperature of 125° C. to 150° C. For the material of the high pressure reactor can be used titanium or Hastelloy C.

It is desirable to provide a preheating reaction zone and an equilibrium reaction zone in the high pressure reactor to be used in the present invention. In the preheating reaction zone, ammonia is blown as fine bubbles into the suspension of ammonium imidosulfonate in ammonium sulfamate, the suspension is preheated at a temperature of 170 to 280° C. under a pressure of 10 to 50 kg./cm.² and the greater part of the reaction is carried out under an ammonia pressure so that the reaction product is a liquid. In the equilibrium reaction zone, the liquid reaction product from the preheating reaction zone is made a film and a reaction equilibrium of $$(NH_4SO_3)_2N \cdot NH_4 \rightleftharpoons 2NH_4SO_3NH_2$$

is quickly completed. In the equilibrium reaction zone, the pressure and the temperature are as in the preheating reaction zone. The residence time in the high pressure reactor is preferably less than about 10 minutes so that the conversion of ammonium sulfamate to ammonium sulfate by thermodecomposition is prevented as much as possible.

According to the process of the present invention, the

rate of yield of ammonium sulfamate is more than 90%, the purity of the ammonium sulfamate is more than 90% and the content of ammonium sulfate is less than 5%. Further, as the medium to suspend ammonium imidosulfonate is ammonium sulfamate as different from the case of adopting any other material for the medium, the product ammonium sulfamate contains no other material. Further, the suspension of ammonium imidosulfonate in ammonium sulfamate is low in corrosiveness.

The process of the present invention shall now be explained hereunder with reference to the accompanying drawing which illustrates diagrammatically the process of the invention. Ammonium imidosulfonate produced by any known method is weighed and conveyed with a conveyer 1 and is fed into a hopper 2. Ammonia separated in a gas-liquid separator 10 is introduced into the hopper 2 and diammonium imidosulfonate is converted to triammonium imidosulfonate. The ammonia discharged out of the hopper may be recovered by any known method or may be used in a step of producing ammonium imidosulfonate by the reaction of ammonia with sulfur trioxide. A part of the product ammonium sulfamate (the equivalent amount to the product used in order to suspend the ammonium imidosulfonate) from the gas-liquid separator 10 is introduced into a mixing tank 3. The temperature is kept above the melting point of ammonium sulfamate but below 150° C. The triammonium imidosulfonate from the hopper is then added thereto and is stirred with a stirrer 4.

The ammonia from the gas-liquid separator 10 is introduced in the mixing tank 3 to keep an ammonia atmosphere in it. The slurry prepared in the mixing tank 3 is introduced into a preheating reaction zone 6 in a high pressure reactor by means of a pressure pump 5. An ammonia is introduced in the form of small bubbles into the preheating reaction zone through pipe 7. In the preheating reaction zone, the pressure is 10 to 50 kg./cm.$^2$. and the temperature is 170 to 280° C. The greater part of the reaction is completed in the preheating reaction zone. The reaction product in a molten state is introduced into an equilibrium reaction zone 8 in which the reaction is completed. In the equilibrium reaction zone 8, the pressure is 10 to 50 kg./cm.$^2$. and the temperature is 170 to 280° C. The equilibrium reaction zone 8 is of such construction that the reaction product introduced from the preheating reaction zone 6 becomes a film and the diffusion of the ammonia gas can be easy. The reaction product (consisting of more than 90% ammonium sulfamate) from the equilibrium reaction zone 8 is cooled to about 140° C. in a cooler 9, is decompressed and enter the gas-liquid separator 10. In the separator, the ammonia is separated from the ammonium sulfamate. The separated ammonia is used for the above described object. A part of the ammonium sulfamate separated from the ammonia is introduced into the mixing tank 3 and the rest is taken out through a pipe and is made a product as it is, as purified or as prilled by any conventional method.

The following examples illustrates the invention but are not to be construed as limiting.

EXAMPLE 1

Into a mixing tank were fed a reaction product (of 0.1% $NH_3$, 4.5% $(NH_4SO_3)_2$ NH, 91.1% $NH_4SO_3NH_2$ and 4.3% $(NH_4)_2 SO_4$) from a gas-liquid separator at a rate of 8.5 kg./hr. and ammonium imidosulfonate (of 0.03% $SO_3$, 92.08% $(NH_4SO_3)_2NH$, 7.07% $NH_4SO_3NH_2$ and 0.82% $(NH_4)_2SO_4$) at a rate of 1.5 kg./hr. The mixture was stirred at a temperature of 135 to 140° C. to suspend the ammonium imidosulfonate in the ammonium sulfamate. The viscosity of the resulting slurry at 135° C. was about 50 centipoises. This slurry was fed into a high pressure reaction tube at a rate of 10 kg./hr. by means of a plunger pump. At the same time, ammonia was introduced into the high pressure reactor at a rate of 0.23 kg./hr. They were made to react with each other at a temperature of 230° under a pressure of 30 kg./cm.$^2$. The residence time in the high pressure reactor was about 10 minutes. The reaction product from the high pressure reactor was cooled to 140° C., was decompressed and was introduced into the gas-liquid separator in which the ammonia was recovered at a rate of 0.11 kg./hr. 8.5 kg./hr. of the reaction product were circulated to the mixing tank so as to be used as a medium for suspending ammonium imidosulfonate. 1.62 kg./hr. of the reaction product were taken out as a product. The rate of conversion of ammonium imidosulfonate to ammonium sulfamate was 91.5%.

Example 2

Ammonium imidosulfonate (of the same composition as in Example 1) was fed at a rate of 4.0 kg./hr. into a hopper of an ammonia pressure of 2 kg./cm.$^2$ to convert diammonium imidosulfonate to triammonium imidosulfonate. From the hopper, 4.3 kg./hr. of triammonium imidosulfonate were fed into a mixing tank of an ammonia atmosphere. A reaction product (of 0.1% $NH_3$, 4.0% $(NH_4SO_3)_2NH$, 91.8% $NH_4SO_3NH_2$ and 4.1% $(NH_4)_2SO_4$) from a gas-liquid separator was introduced into the mixing tank at a rate of 6.0 kg./hr. They were stirred to suspend triammonium imidosulfonate in the reaction product. The temperature in the mixing tank was made 140° C. The residence time of the resulting slurry in the mixing tank was about 3 hours. The viscosity of the slurry was about 1,000 centipoises at 140° C. This slurry was fed into a preheating reaction zone in a high pressure reactor at a rate of 10.3 kg./hr. by means of a plunger pump. At the same time, ammonia was fed into the preheating reaction zone at a rate of 0.4 kg./hr. They were made to react with each other at a temperature of 230° C. under a pressure of 30 kg./cm.$^2$. The reaction mixture from the preheating reaction zone was fed into an equilibrium reaction zone wherein the reaction mixture was made a film at a temperature of 230° C. and a pressure of 30 kg./cm.$^2$ to complete the reaction. The total residence time in the preheating reaction zone and equilibrium reaction zone was about 10 minutes. The reaction product from the equilibrium reaction zone was cooled to 140° C. in a cooler, was decompressed and was introduced into a gas-liquid separator. 0.4 kg./hr. of ammonia gas was separated in the gas-liquid separator and 10.3 kg./hr. of ammonium sulfamate of a purity of 91.8% were obtained. 6.0 kg./hr. of the thus-obtained ammonium sulfamate were circulated to the mixing tank. 4.3 kg./hr. of it were taken out as a product. The rate of conversion of ammonium imidosulfonate to ammonium sulfamate was 92.0%.

What is claimed is:

1. A process for continuously producing ammonia sulfamate under an ammonia pressure which comprises mixing ammonium imidosulfonate with molten ammonium sulfamate in a mixing zone to form a slurry, heating the resulting slurry under an ammonia pressure in a high pressure reaction zone to convert ammonium imidosulfonate to ammonium sulfamate in the molten state, circulating a part of the ammonium sulfamate from the high pressure reaction zone into the mixing zone and mixing said sulfamate with ammonium imidosulfonate.

2. A process according to claim 1 wherein the slurry in the mixing zone is maintained at a temperature of 125° C. to 150° C.

3. A process according to claim 1 wherein the amount of the ammonium imidosulfonate in the mixing zone is less than an equal amount by weight to the molten ammonium sulfamate.

4. A process according to claim 1 wherein ammonium imidosulfonate is triammonium imidosulfonate.

5. A process according to claim 1 wherein ammonia is introduced into the mixing zone to keep an ammonia atmosphere therein.

6. A process according to claim 1 wherein the temperature is 170° C. to 280° C. and the pressure is 10 kg./cm.$^2$ to 50 kg./cm.$^2$ in the high pressure reaction zone.

7. A process according to claim 1 wherein the slurry is heated in a preheating reaction zone of the high pressure reaction zone and subsequently in an equilibrium reaction zone of the high pressure reaction zone in the form of a film under an ammonia pressure of 10 kg./cm.$^2$ to 50 kg./cm.$^2$ and at a temperature of 170° C. to 280° C.

References Cited

UNITED STATES PATENTS

| 3,404,949 | 10/1968 | Ito | 23—114 |
| 2,514,955 | 7/1950 | Kamlet | 23—114 |
| 2,715,563 | 8/1955 | Robinson et al. | 23—114 |

FOREIGN PATENTS

| 647,316 | 12/1950 | Great Britain. |

OSCAR R. VERTIZ, Primary Examiner

E. C. THOMAS, Assistant Examiner